March 1, 1966 E. A. WILSON 3,237,740
CLUTCH PLATE
Filed March 2, 1964 2 Sheets-Sheet 1

INVENTOR.
EMERSON A. WILSON
BY
*Patrick J. Henry*
ATTORNEY

March 1, 1966  E. A. WILSON  3,237,740
CLUTCH PLATE

Filed March 2, 1964  2 Sheets-Sheet 2

INVENTOR.
EMERSON A. WILSON
BY
*Patrick F. Henry*
ATTORNEY 3,237,740
CLUTCH PLATE
Emerson A. Wilson, 808 Avon Ave. SW., Atlanta, Ga.
Filed Mar. 2, 1964, Ser. No. 348,380
3 Claims. (Cl. 192—107)

This invention relates to a clutch plate and particularly to a clutch plate of the sort used in an automotive clutch and having removable and replacement face plate segments and also reinforced spring slots.

Automotive clutch plates are well known in the art for many years. These plates are generally circular in formation and they include a plurality of clutch plate springs mounted in a circular plate in individual slots therein and serving to provide a spring tension which reduces or eliminates clutch chatter. The clutch springs are mounted in the main clutch plate and also in a secondary circular plate smaller than the main plate and spaced therefrom. The entire assembly usually is mounted on a splined shaft. The breaking of a portion of the outer edge of the clutch plate is not unusual. When this happens it is necessary to replace the clutch plate and in some model clutch plates or sets it is possible to replace only a segment as in the present plate. Another failure of clutch plates is found in the area in which the individual clutch springs are located. The tension or compression of the springs and other factors causes failure such as metal fatigue resulting in a break in the clutch plate necessitating the replacement or repair of the plate. The present clutch plate provides individual, removable and replaceable segments which also provide a special reinforcement for the clutch springs. This arrangement adds significantly to the wear of the clutch plate to reduce the chances of failure thereby sometimes eliminating costly clutch repair jobs.

Generally described, without restriction on the scope of my invention, the present clutch plate is essentially similar to many other prior art clutch plates as will appear from the drawings accompanying this application. A main circular plate of metal is provided with a center internally splined cylindrical mounting sleeve. The back of the clutch plate is provided with a smaller, and sometimes heavier plate spaced from the center clutch plate and attached to the center sleeve. Slots or openings or channels are formed in the clutch plate and the secondary plate in aligned position to accommodate coil springs located therein. Typically there are six such springs in one clutch plate. These springs are positioned substantially at the same radial position from the center of the mounting sleeve and are spaced circumferentially on the same circle. The ends of each coil spring are mounted under compression in the slots formed in the clutch plate metal. The outer face of the present clutch plate is not made from a solid sheet of material and is not a solid continuous plate face but rather is a plurality of individual segments forming the circular periphery of the plate and each being substantially identical with the other, there being, typically in the present form, six such segmental plates. Each segment or segmental plate is attached by rivets to the main body of the clutch plate and may be removed and replaced as an individual segment. The ends of each segment, formed somewhat in a semi-circular or crescent shape, are notched to form straight portions aligned with and forming a part of the end of the slots or channels in which the springs are mounted. This provides a double reinforcement for each end of the compression or tension springs and thereby substantially doubles the strength of the clutch plate.

A primary object of this invention is to provide the clutch plate with individual removable segments that have portions thereof forming part of the spring channels to reinforce the plate.

Another object of this invention is found in the provision of individual segments forming the outer portion of a clutch plate and each providing one end of an adjacent spring channel or slot.

Another object of this invention is to reinforce the spring channel of a clutch plate without additional metal other than the segmental portions of the plate.

Still another object of this invention is found in the shape of the segmental portions whereby material is conserved but maximum strength is obtained.

Other and further objects and advantages of my invention will become apparent upon reading the following specification taken in conjunction with the accompanying drawings, in which.

Figure 1:
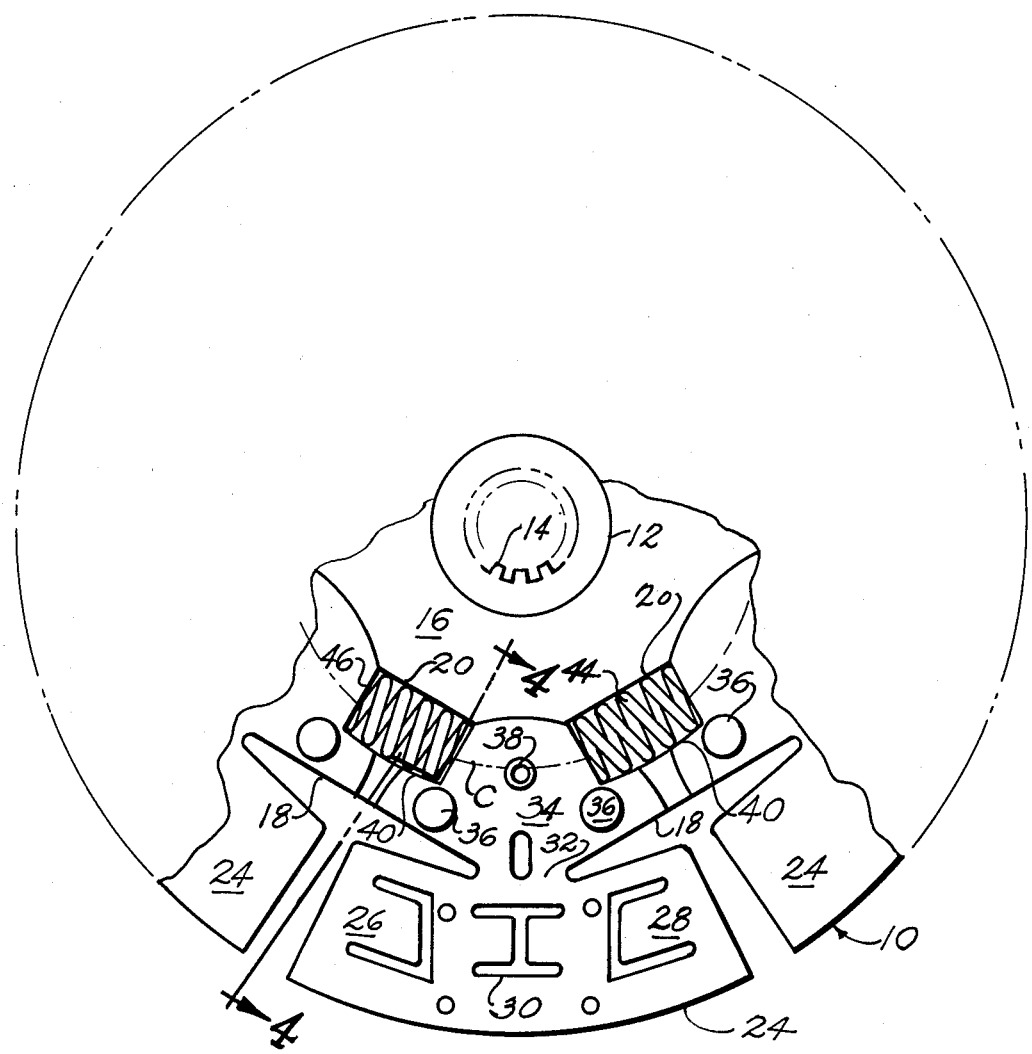
FIG. 1 is a top plan view of the main or front face of the clutch plate.
Figure 4:
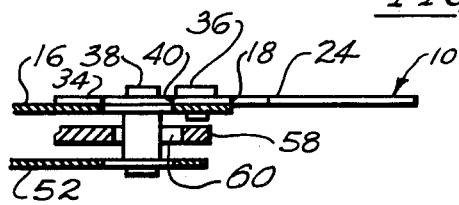
FIG. 4 is a cross-sectional view taken substantially along lines 4—4 in FIG. 1.

Referring initially to the front of the clutch plate shown in FIG. 1, it is to be understood that the full lines and portions of the plate in FIG. 1 are not shown in full completion in the drawings since only one complete segment is showing and portions on each side are shown and these are understood to be repeated around the circumference of the plate in identical fashion since the plate is an association of identical segmens on a center arranged symmetrically or identically around the circle.

The clutch plate designated generally by the overall reference numeral 10 is constructed primarily from metal plate. The plate 10 is normally attached to a center hub, cylindrical sleeve or mounting cylinder 12 of metal having an internally splined portion 14 which may be mounted for movement on a splined clutch shaft (not shown). The main body of the plate 10 is movably mounted on the hub 12 and is designated by reference numeral 16 extending as is a six sided figure having the terminal edges located at reference numeral 18, on all six sides. A number of identical slots or channels 20 of rectangular formation are cut through and from plate 16 and these are known as spring channels or slots. Channels 20 are the same distance from the center of hub 12 on the same circle through the central longitudinal axis thereof and are equidistant apart along the circumference of the imaginary circle C. Plate 16 moves relative to the hub 12, or vice versa, against spring action and together with a back plate, to be described hereinafter.

The outer face of clutch plate 10 is formed compositely as the remainder of a complete circle from a plurality of individual segments 24 stamped or otherwise cut from metal plate and the shape shown in FIG. 1 with circumferential sides 26, 28 and slot 30 attached by web portion 32 to an inner portion 34 fastened in place to the main body 16 by means of heavy rivets 36 and also by means of cylindrical fastening and spacer members 38 fastened through both portion 34, plate 16 and a back plate 52 to be described. The portion 34 is almost semicircular in formation but is provided with notched peripheral edges 40 forming ends of each of the ends of the spring channels or slots 20 in which are mounted coil springs 44 of heavy construction having the terminal ends 46 thereof pressing against the faces of the thin edges of plate 16 and portion 34 of segment 24. It is to be noted that each of the edges of the portions 40 of portion 34 provide double reinforcement with the plate 16 for the ends of the channels 20 and against which the springs 44 act. This substantially doubles, or better than doubles, the life of the plates at this portion which have been known to fail.

Figure 2:
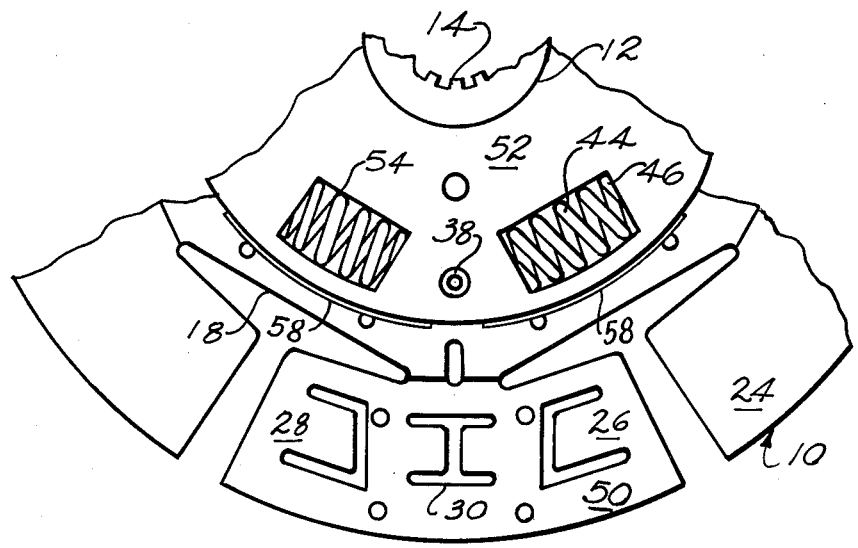
FIG. 2 is a bottom plan view of the rear or back plate of the clutch plate shown in FIG. 1.
Figure 3:
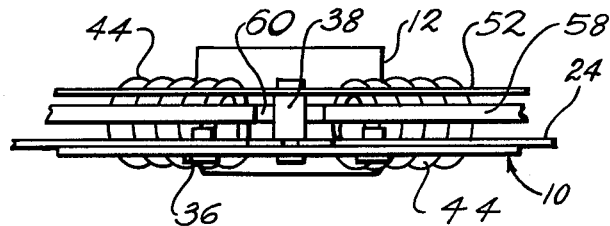
FIG. 3 is a side elevation view of the clutch plate in the position shown in FIG. 2.

The back of the plate 10 is shown in FIG. 2, and designated generally by reference numeral 50. A secondary, circular plate 52 of smaller radius than plate 10 is mounted for movement on the same hub 14 at a small distance longitudinally along the hub 12 from the main plate 10 and spaced from and attached to plate 16 by members 38. This plate also has the same spring channel designated by reference numeral 54 in alignment with the spring channel 20 formed in plate 16. The fastening members 38 extend through and space plate 52 from plate 10. Both plates 16 and 52 move relative to hub 12.

A center spring drive plate 58 is attached to hub 14 and mounted between plates 10 and 52 and is provided with a slot in which springs 44 are placed. Center spring plate 58 is suspended between plates 52 and 16, which are spaced and fastened together by means of the fasteners 38 which fit into slots 60 in plate 58, which rotates a limited amount. The operation of the clutch plate is the same as the operation of any clutch plate and has not been changed by the present construction. Hub 14 drives plate 58 against springs 44 to drive plate 16, [52] which are connected. However, as mentioned several times heretofore, the segments 24 provide at portions 40 further reinforcement of significant value to the top portions of springs 44 at which failure may occur. The additional thickness of material on the top of the plate 16 afforded by the thickness of the segments 24 on the top provides further thickness to the spring channel 20 which increases the confinement of the ends and one portion of the edges of the coil springs 44. If a segment 24 is broken or otherwise fails, the rivets 36 may be removed and the new segment of identical construction 24 may be riveted by new rivets 36 in place of the old broken one. Thus, broken clutch plates may be exchanged and rebuilt at a substantial saving and cost over new and completely replaced clutch plates.

While I have shown and described a particular embodiment of my invention together with a suggested mode of operation thereof, this is by way of illustration only and does not constitute any sort of limitation on the scope of my invention since various alterations, changes, deviations, eliminations, substitutions, variations and changes may be made in the embodiment shown without departing from the scope of my invention as defined in the appended claims.

I claim:

1. In a clutch plate having a main clutch face plate and a secondary plate spaced from the main plate and both mounted on a central hub on which there is a drive plate between said face plate and secondary plate, and spring slots formed on the face and secondary plate forming respective spring channels having two ends and four corners, there being two corners at each end accommodating large coil springs therein extending between said plates, the improvement comprising:
    (a) a plurality of individual clutch plate segments together forming a complete circular plate and each attached to the main clutch face plate on the top thereof and together forming a complete circular plate face at the outer portion thereof, said segments being individually removable and replaceable.
    (b) the inner ends of each of said segments being juxtapositioned over and against said main plate surfaces and extending between and being notched to fit about each of respective opposite ends of the coil spring channels and extending along both edges of one corner and along each end of a respective adjacent spring slot, each of said segments extending from the end of one coil spring channel across said main plate surface and to the end of the next adjacent coil spring channel.

2. In a clutch plate having a main clutch face plate and a secondary plate spaced from the main plate and both mounted on a central mounting hub on which there is a drive plate between said face plate and secondary plate, and spring slots formed on the face and secondary plate forming respective spring channels having two ends and four corners, there being two corners at each end accommodating large coil springs therein extending between said plates, the improvement comprising:
    (a) a plurality of individual clutch plate segments together forming a complete circular plate and each attached separately to and partly overlapping the main clutch face plate and together forming a complete circular plate face at the outer portion thereof.
    (b) the inner ends of each of said segments being juxtapositioned over and against said main plate surfaces and extending between and being notched to fit about each of respective opposite ends of the coil spring channels and extending along both edges of one corner and along each end of a respective adjacent spring slot, each of said segments extending from the end of one coil spring channel across said main plate surface and to the end of the next adjacent coil spring channel.

3. In a clutch plate having a main clutch face plate, and a secondary plate spaced from the main plate and both mounted on a central hub on which there is a drive plate between said face plate and secondary plate, and spring slots formed on the front and secondary plates forming respective spring channels having two ends and four corners accommodating large coil springs therein extending between said plates, the improvement comprising:
    (a) individual clutch face plate segments each attached separately to the main clutch face plate on and overlapping the top thereof and together forming a complete circular plate face at the outer portion thereof, composed of individual and removable segments,
    (b) the inner ends of each of said segments being juxtapositioned over and against said main plate surfaces and extending between and being notched to fit about each of respective opposite ends of the coil spring channels and extending along both edges of one corner and along each end of a respective adjacent spring slot, each of said segments extending from the end of one coil spring channel across said main plate surface and to the end of the next adjacent coil spring channel to reinforce the ends of the spring slots against the action of the springs.

References Cited by the Applicant

UNITED STATES PATENTS

| 2,293,781 | 8/1942 | Thelander | 192—68 |
| 2,392,246 | 1/1946 | Katcher | 192—107 |
| 2,566,394 | 9/1951 | Zeidler | 192—107 |
| 2,574,966 | 11/1951 | Goodwin | 192—107 |
| 2,589,508 | 3/1952 | Nutt et al. | 192—107 |

FOREIGN PATENTS 216,565  12/1941  Switzerland.

DON A. WAITE, *Primary Examiner.*

DAVID J. WILLIAMOWSKY, *Examiner.*